(12) United States Patent
Zenner et al.

(10) Patent No.: US 11,007,894 B2
(45) Date of Patent: May 18, 2021

(54) ELECTRIFIED VEHICLE CONTROL DURING TOWING

(71) Applicant: FORD GLOBAL TECHNOLOGIES, LLC, Dearborn, MI (US)

(72) Inventors: Thomas Zenner, Dueren NRW (DE); Mazen Hammoud, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 407 days.

(21) Appl. No.: 16/017,939

(22) Filed: Jun. 25, 2018

(65) Prior Publication Data
US 2019/0009760 A1 Jan. 10, 2019

(30) Foreign Application Priority Data
Jul. 4, 2017 (DE) .................. 10 2017 211 314.6

(51) Int. Cl.
*B60L 58/12* (2019.01)
*B60T 8/32* (2006.01)
(Continued)

(52) U.S. Cl.
CPC .............. *B60L 58/12* (2019.02); *B60T 8/171* (2013.01); *B60T 8/1708* (2013.01); *B60T 8/323* (2013.01);
(Continued)

(58) Field of Classification Search
CPC .. B60L 58/12; B60L 2200/28; B60L 2240/14; B60L 58/00; B60L 58/10;
(Continued)

(56) References Cited

U.S. PATENT DOCUMENTS 4,762,191 A * 8/1988 Hagin ..................... B60L 7/18
180/14.2
4,771,838 A * 9/1988 Ketcham ............... B62D 12/02
180/14.2
(Continued)

FOREIGN PATENT DOCUMENTS

DE 102010042907 A1 4/2012
EP 0947376 A1 4/1999

OTHER PUBLICATIONS

ETRAILER.COM; Supplemental Braking System; https://www.etrailer.com/faq-tow-bar-braking.aspx; 7 pages; date unknown.
(Continued)

*Primary Examiner* — Angelina Shudy
(74) *Attorney, Agent, or Firm* — Brooks Kushman PC; David Kelley

(57) ABSTRACT

An operating method for an electrified motor vehicle having an electric drive while being coupled to a towing vehicle by a connecting device in such a manner that the pulling forces and pushing forces between the vehicles are transmitted. The towing vehicle may communicate data to the motor vehicle used to control the motor vehicle to provide a controlled force exerted on the towing vehicle by the motor vehicle during towing. The controlled force exerted on the towing vehicle may vary based on the prevailing force direction between the vehicles, acceleration, and battery state of charge (SOC) of the motor vehicle. The controlled force may include a driving force or a braking force. The braking force may be provided by regenerative braking of the motor vehicle and/or by friction braking of the motor vehicle.

5 Claims, 2 Drawing Sheets

(51) Int. Cl.
*B60T 8/171* (2006.01)
*B60T 8/17* (2006.01)
*B60T 8/24* (2006.01)

(52) U.S. Cl.
CPC ....... *B60L 2200/28* (2013.01); *B60L 2240/14* (2013.01); *B60T 8/248* (2013.01)

(58) Field of Classification Search
CPC .......... B60L 58/13; B60L 58/14; B60L 58/15; B60T 8/1708; B60T 8/171; B60T 8/323; B60T 8/248; B60T 8/17; B60T 8/1701; B60T 8/172; B60T 8/32; B60T 8/3205; B60T 8/321; B60T 8/322; B60T 8/24; B60W 10/04; B60W 10/18; B60W 10/20; B60W 30/02; B60W 30/06; B60W 30/16; B60W 2300/14; B60W 2520/22; B60W 2530/203; B60W 2530/207; B60W 2720/22; B62D 59/04
USPC .......................................................... 701/48
See application file for complete search history.

(56) References Cited

U.S. PATENT DOCUMENTS

| | | | | |
|---|---|---|---|---|
| 6,390,215 | B1 * | 5/2002 | Kodama | B60L 50/62 180/65.22 |
| 6,419,037 | B1 * | 7/2002 | Kramer | B62D 53/005 180/14.2 |
| 6,516,925 | B1 * | 2/2003 | Napier | B60T 1/10 188/112 A |
| 6,668,225 | B2 | 12/2003 | Oh et al. | |
| 6,866,350 | B2 | 3/2005 | Palmer et al. | |
| 7,338,335 | B1 * | 3/2008 | Messano | B62D 35/001 180/65.22 |
| 7,743,859 | B2 * | 6/2010 | Forsyth | B62D 59/04 180/65.1 |
| 7,798,263 | B2 * | 9/2010 | Tandy, Jr. | B60T 8/246 180/14.6 |
| 8,700,284 | B2 | 4/2014 | Wojkowicz | |
| 9,016,807 | B1 | 4/2015 | Pieronek et al. | |
| 9,475,470 | B2 * | 10/2016 | Maitlen | B60T 8/321 |
| 9,610,815 | B2 * | 4/2017 | Wendland | B60D 3/00 |
| 9,738,125 | B1 * | 8/2017 | Brickley | B60D 1/26 |
| 9,857,255 | B2 * | 1/2018 | Hagan | B60L 50/66 |
| 10,309,871 | B2 * | 6/2019 | Hagan, Jr. | B60D 1/155 |
| 10,500,975 | B1 * | 12/2019 | Healy | B60L 50/50 |
| 10,596,913 | B2 * | 3/2020 | Healy | B60L 50/53 |
| 10,744,888 | B2 * | 8/2020 | Healy | B60L 8/003 |
| 10,766,478 | B2 * | 9/2020 | Healy | B60L 50/15 |
| 10,960,860 | * | 3/2021 | Sanchez | B60T 8/1708 |
| 2004/0148085 | A1 * | 7/2004 | Heuer | B60T 8/1766 701/70 |
| 2004/0183372 | A1 * | 9/2004 | Heuer | B60T 8/1708 303/123 |
| 2007/0193795 | A1 * | 8/2007 | Forsyth | B62D 59/04 180/65.285 |
| 2009/0308670 | A1 * | 12/2009 | Shepard, Jr. | B60L 15/32 180/14.2 |
| 2010/0065344 | A1 * | 3/2010 | Collings, III | B60W 10/26 180/2.1 |
| 2010/0065348 | A1 * | 3/2010 | Arad | B60L 50/60 180/11 |
| 2010/0318241 | A1 * | 12/2010 | Post, II | B60W 50/0098 701/2 |
| 2013/0311058 | A1 * | 11/2013 | Wojtkowicz | H02J 7/1461 701/70 |
| 2015/0204741 | A1 * | 7/2015 | Hagan | B60W 10/08 180/11 |
| 2017/0129558 | A1 * | 5/2017 | Gugel | B60W 20/10 |
| 2018/0079375 | A1 * | 3/2018 | Cekola | B60R 16/0231 |
| 2019/0009760 | A1 * | 1/2019 | Zenner | B60L 58/12 |
| 2019/0084533 | A1 * | 3/2019 | Kasper | G08G 1/052 |
| 2019/0084540 | A1 * | 3/2019 | Kasper | G08G 1/22 |
| 2019/0217831 | A1 * | 7/2019 | Viele | G07C 5/0816 |
| 2020/0122715 | A1 * | 4/2020 | Layfield | B60L 15/20 |
| 2020/0215921 | A1 * | 7/2020 | Healy | B60L 1/02 |
| 2021/0031770 | A1 * | 2/2021 | Knorr | B62D 59/04 |

OTHER PUBLICATIONS

DE Examination Report DE 10 2017 211 314.6 Filed Mar. 29, 2018, 9 pages.

* cited by examiner

ELECTRIFIED VEHICLE CONTROL DURING TOWING

CROSS-REFERENCE TO RELATED APPLICATIONS

This application claims foreign priority benefits under 35 U.S.C. § 119(a)-(d) to DE Application 10 2017 211 134.6 filed Jul. 4, 2017, which is hereby incorporated by reference in its entirety.

TECHNICAL FIELD

The present disclosure relates to an operating method for an electrified motor vehicle while being towed behind a towing vehicle.

BACKGROUND

The prior art discloses in U.S. Pat. No. 8,700,284, DE 102010042907 A1 or also U.S. Pat. No. 6,866,350 trailers or motor vehicles that generate electrical energy while they are being pulled by a towing vehicle.

SUMMARY

In various embodiments, an operating method and also a motor vehicle and a towing vehicle realize an improved procedure for towing/being towed. An operating method may include communicating data between the towing vehicle and the motor vehicle that is used to control the motor vehicle to provide a driving force or braking force depending on the prevailing force between the towing vehicle and the motor vehicle, acceleration, and battery state of charge (SOC) of the motor vehicle.

In the case of the operating method in accordance with one or more embodiments of the disclosure for a towing/towed arrangement having a towing vehicle, and a motor vehicle that comprises an electric drive and is coupled to the towing vehicle by a connecting device in such a manner that the pulling forces and pushing forces are transmitted between the vehicles, a controlled force is exerted on the towing vehicle by the motor vehicle when the towing/towed arrangement is moving.

In the case of the operating method in accordance with one or more embodiments, the motor vehicle supports the towing vehicle with respect to the driving operation and/or braking operation, which may include regenerative braking and/or service/friction braking. The moving towing/towed procedure during which the motor vehicle is coupled to the towing vehicle is thus more efficient. The towing vehicle may include a combustion engine that may cooperate with an electric drive of the motor vehicle to operate as an integrated hybrid vehicle.

In one advantageous embodiment of the operating method, towing vehicle data that includes the driving state of the towing vehicle or an instruction to the motor vehicle is acquired during a data acquisition step and the force that is exerted on the towing vehicle is controlled in response to the towing vehicle data. The instruction to the motor vehicle includes in particular a desired intervention on the part of the motor vehicle to provide driving force or braking force.

As a consequence, the towing vehicle is supported by the motor vehicle in a more purposeful manner depending upon the prevailing situation.

In a further advantageous embodiment of the operating method, the towing vehicle data is transmitted by the towing vehicle or received by the motor vehicle during the data acquisition step. In addition, or as an alternative thereto, a force that is prevailing at the connecting device is ascertained during the data acquisition step. In addition, or as an alternative to at least one aforementioned variant, at least one item of data from an internal sensor in the motor vehicle is used during the data acquisition step.

It is possible to perform an adjustment as quickly as possible by virtue of receiving towing vehicle data regarding the driving state of the towing vehicle or regarding the desired intervention on the part of the motor vehicle into the traction operation or braking operation. It is also possible to avoid erroneous interpretations. In particular, appropriate traction commands and braking commands may be generated by a towing vehicle control unit of the towing vehicle and transmitted to the motor vehicle.

In contrast, by virtue of evaluating data from internal sensors in the motor vehicle or sensors that may be coupled to the motor vehicle, it is possible for any conventional towing vehicle to be supported, in particular any conventional camper van. It is not necessary to have a towing vehicle communication unit for the motor vehicle to provide support.

In a further advantageous embodiment of the operating method, the motor vehicle performs a pushing procedure in response to a first item of towing vehicle data. In other words, a pushing force is exerted on the towing vehicle. In particular, the electrical drive of the motor vehicle is operated during the pushing procedure.

By virtue of the pushing procedure, support is provided to the towing vehicle during the traction operation. The motor vehicle is consequently used as a traction assist device for the towing vehicle.

In a further advantageous embodiment of the operating method, the motor vehicle performs a towing procedure in response to a second item of towing vehicle data. In other words, a pulling force is exerted on the towing vehicle. In particular, electrical energy is generated by a generator in the motor vehicle during the towing procedure.

By virtue of the towing procedure, the towing vehicle is supported in particular during the braking operation. The motor vehicle is consequently used as a braking assist device for the towing vehicle. The load on the mechanical braking devices of the towing vehicle is thus reduced and said devices wear more slowly.

In a further advantageous embodiment of the operating method, simultaneous travel with the motor vehicle occurs in response to a third item of towing vehicle data. In other words, neither a pushing force nor a pulling force is exerted on the towing vehicle. In particular, the electric drive of the motor vehicle is operated during the simultaneous travel procedure. As a result, the motor vehicle does not represent any additional load for the towing vehicle.

The motor vehicle in accordance with the invention is configured to perform the operating method in all embodiments. The motor vehicle comprises an electric drive having an electric machine powered by an associated traction battery. The electric machine may operate as a generator to charge the traction battery during regenerative braking.

The towing vehicle in accordance with one or more embodiments is configured to pull the motor vehicle and includes a towing vehicle communication unit that is configured to provide the motor vehicle with towing vehicle data that includes the driving state of the towing vehicle or an instruction to the motor vehicle. The instruction includes in particular a request to intervene in the traction operation or braking operation. The towing vehicle is preferably configured as a camper van.

Consequently, a towing vehicle is provided for performing the operating method in accordance with one or more embodiments and is configured to communicate with a coupled motor vehicle being towed.

The towing/towed arrangement in accordance with one or more embodiments includes a towing vehicle and a motor vehicle that is coupled to the towing vehicle in such a manner that the pulling forces and pushing forces are transmitted. Consequently, a towing/towed arrangement is also provided for performing the operating method in accordance with one or more embodiments. The towing/towed arrangement as one unit is able to benefit from the operating method in accordance with one or more embodiments and use the mentioned advantages.

In one advantageous embodiment of the towing/towed arrangement, the connecting device is a towing dolly. As a result of using a towing dolly, it is not necessary to actively steer the motor vehicle during the towing procedure. It is only necessary to fix the steering system in a straight line.

Further advantages of one or more embodiments are evident in the detailed description and drawings. The embodiments are further explained with reference to the drawings and the description below. In the drawings:

DETAILED DESCRIPTION

As required, detailed embodiments are disclosed herein; however, it is to be understood that the disclosed embodiments are merely representative of the claimed subject matter that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
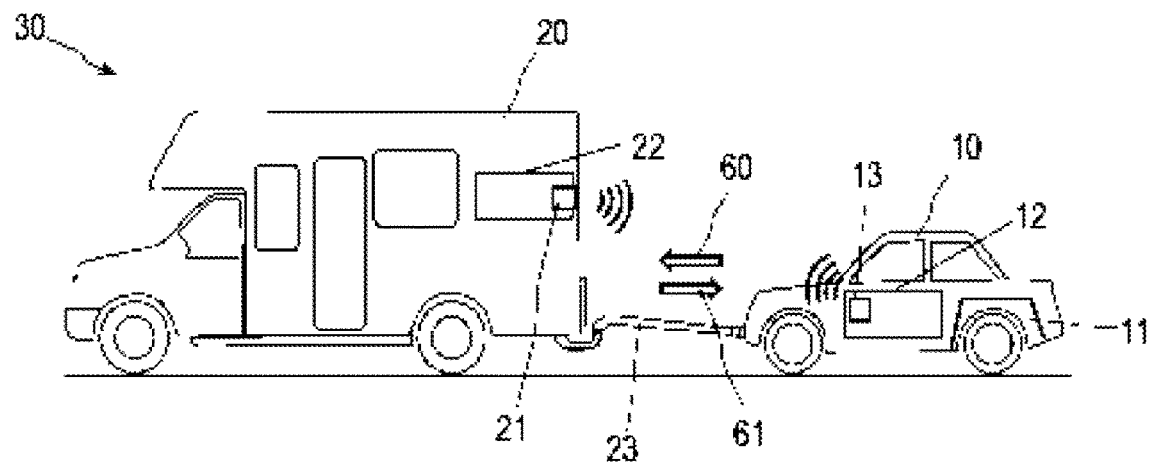
FIG. 1 illustrates a towing/towed arrangement comprising a towing vehicle and a motor vehicle.
Figure 2:
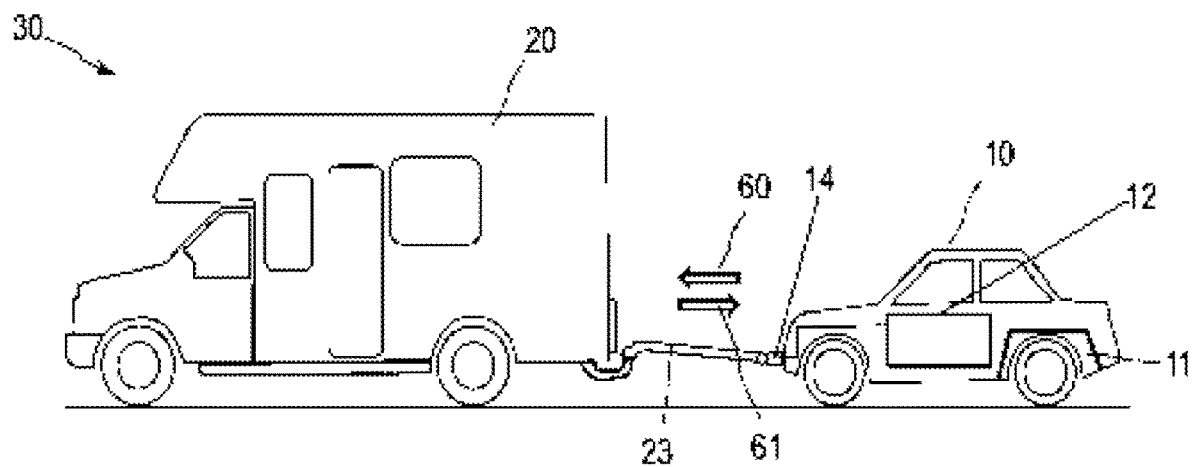
FIG. 2 illustrates another towing/towed arrangement according to one or more embodiments.

FIGS. 1 and 2 illustrate a schematic view of the towing/towed arrangement 30 in accordance with the invention in each case in an exemplary embodiment. The towing/towed arrangement 30 includes a motor vehicle 10 in accordance with the invention and a towing vehicle 20 in accordance with the invention. The motor vehicle 10 is coupled to the towing vehicle 20 in such a manner that the motor vehicle 10 can transmit to the towing vehicle 20 both the pulling forces and also pushing forces. The towing vehicle 20 and the motor vehicle 10 are connected to one another via a connecting device 23 and connected in such a manner that the pulling forces and pushing forces are transmitted. The connecting device 23 is by way of example a coupling rod, a towing bar or in particular a towing dolly. According to the prior art, towing dollies in particular are suitable for towing a motor vehicle behind a towing vehicle, for example a camper van, without having to actively simultaneously steer the vehicle that is being towed. This is illustrated in FIGS. 1 and 2. It is also possible that the motor vehicle 10 is arranged with one axle on a trailer that is connected to the towing vehicle 20 in a such a manner that the pulling forces and the pushing forces are transmitted, wherein it is possible for the second axle of the motor vehicle 10 to be driven and for said axle to be in operating contact with the road.

If the towing/towed arrangement 30 is moving or starts to move, the towing/towed arrangement 30 in the sense of this document is described as a moving towing/towed procedure.

The towing vehicle 20 is preferably a camper van. The towing vehicle 20 is configured for pulling a conventional motor vehicle such as the motor vehicle 10 in accordance with the invention. The towing vehicle 20 comprises optionally a towing vehicle communication unit 21 that is configured so as to provide at least one item of towing vehicle data, in particular for transmission via radio. The towing vehicle data is at least one item of data regarding the driving state of the towing vehicle 20 and/or a request, in particular a brake and/or drive request, to the motor vehicle 10. In addition, the towing vehicle communication unit 21 is configured in particular so as to receive at least one item of motor vehicle data from the motor vehicle 10, in particular via radio. The towing vehicle 20 includes moreover a towing vehicle control unit 22 that is configured so as to control the operation of the towing vehicle 20. The towing vehicle 20 is configured so as to control the operating method 40 in accordance with the invention.

The motor vehicle 10 in accordance with the invention is a battery electric vehicle (BEV) and comprises an electric drive 11. The electric drive 11 includes a battery and at least one electric machine. The electric drive 11 is configured so as to drive the motor vehicle 10. In addition, the electric drive 11 is configured so as to generate electrical energy from the kinetic and/or potential energy of the motor vehicle 10, thus by recuperation in particular by braking recuperation.

The motor vehicle 10 includes in addition a motor vehicle control unit 12 that is configured so as to control the operation of the motor vehicle 10. The motor vehicle 10 comprises moreover in particular a motor vehicle communication unit 13 that is configured so as to receive at least one item of towing vehicle data, in particular via radio. In addition, the motor vehicle communication unit 13 is configured in particular so as to transmit in particular via radio at least the motor vehicle data regarding a parameter of the motor vehicle 10, in particular regarding a capability of the motor vehicle 10, such as a maximum drive output and/or braking power.

The motor vehicle 10 comprises in particular at least one sensor. The sensor is in particular a force sensor 14 that is configured so as to detect forces that are acting on the connecting device 23. Moreover, the motor vehicle 10 comprises in particular an acceleration sensor and/or wheel rotational speed sensors. The at least one sensor 14 is connected to the motor vehicle control unit 12 in such a manner as to transmit data.

The motor vehicle 10 includes in particular an active steering system that is configured so as to perform steering interventions. The steering system is connected to the motor vehicle control unit 12 in such a manner as to transmit data. The motor vehicle 10 is consequently suitable to be connected to the towing vehicle 20 by means of a coupling rod as a connecting device 23.

In addition, it is also possible to fix the steering system of the motor vehicle 10 in particular in a straight line. The motor vehicle 10 is consequently suitable to be connected to the towing vehicle 20 by means of a towing dolly as a connecting device 23 since it is necessary when using a suitable towing dolly to fix the steering system of the motor vehicle 10 in a straight line.

The motor vehicle 10 is likewise configured so as to control the operating method 40 in accordance with the invention. The operating method 40 in accordance with the invention is controlled by the towing vehicle 20 or by the motor vehicle 10. In the case of the operating method 40 in accordance with the invention at least the electric drive 11 of the motor vehicle 10 is controlled, in particular in addition a towing vehicle drive is controlled. The operating method 40 represents a supporting procedure in which the motor vehicle 10 supports the towing vehicle 20 with respect to the driving operation and/or braking operation.

In the case of the operating method 40 in accordance with the invention a controlled force 60, 61 is exerted on the towing vehicle 20 during a moving towing/towed procedure with the motor vehicle 10. The motor vehicle 10 is participating in the moving towing/towed procedure if it is coupled to the towing vehicle 20 in such a manner that the pulling forces and pushing forces are transmitted and the towing/towed arrangement 30 is moving or starts to move. The force 60, 61 is controlled in particular in response to at least one item of towing vehicle data that is provided to the motor vehicle 10. The at least one item of towing vehicle data is data regarding the driving state of the towing vehicle 20 and/or an instruction to the motor vehicle 10.

Figure 3:
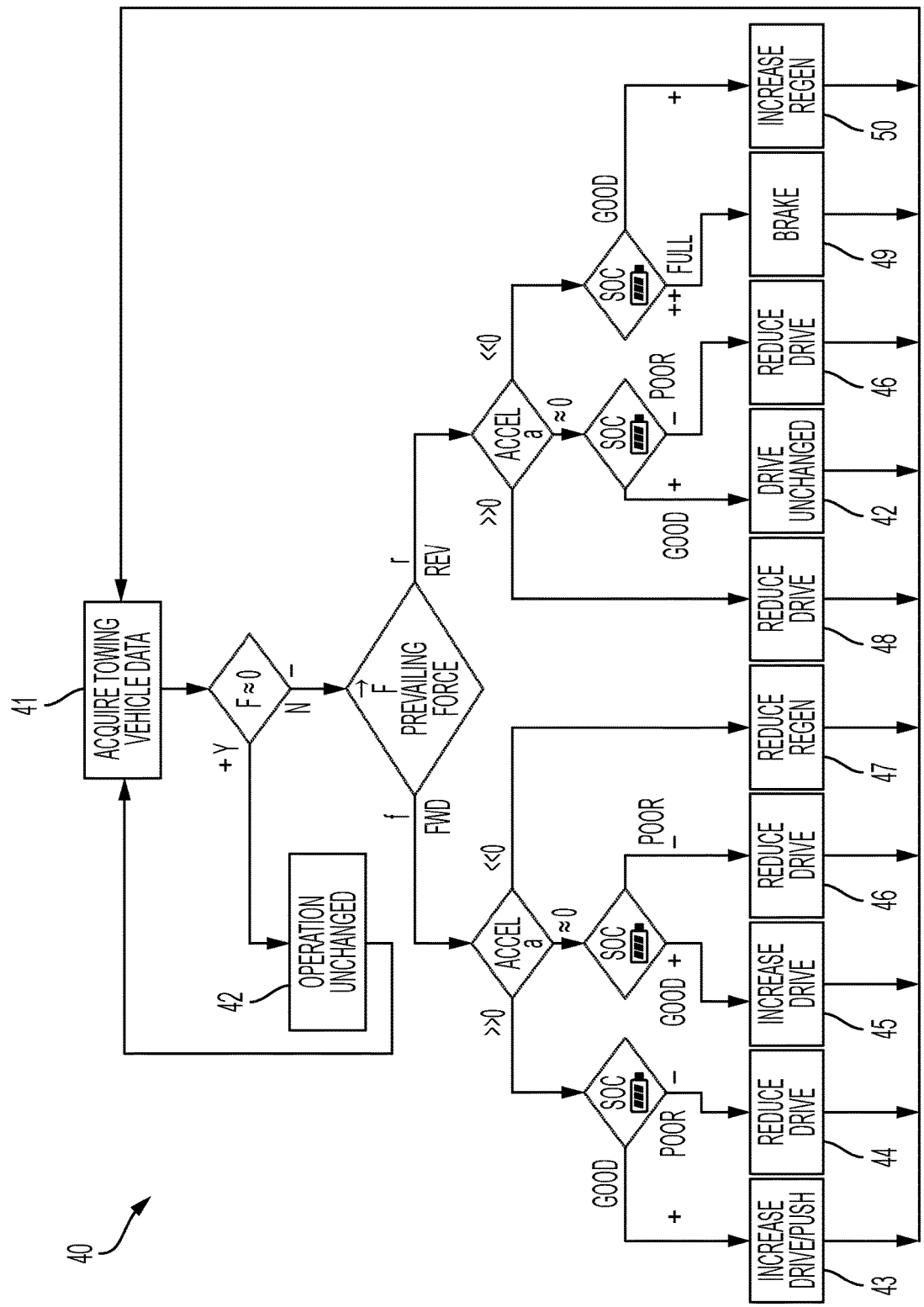
FIG. 3 illustrates an operating method in accordance with one or more embodiments.

FIG. 3 illustrates in a flow diagram a schematic view of the operating method 40 in accordance with the invention in an exemplary embodiment variant.

Initially, the towing vehicle data is acquired in a data acquisition step 41. The data acquisition step 41 may be performed in various ways. On the one hand, it is possible to perform a passive communication between the vehicles 10, 20 by means of the communication units 13, 21, wherein the towing vehicle data is transmitted regularly from the towing vehicle 20 to the motor vehicle 10, in particular via radio. The towing vehicle data includes data regarding the driving state of the towing vehicle 20. When the communication is being performed in a passive manner, the motor vehicle 10 controls the operating method 40.

As an alternative to the passive communication, it is also possible to perform an active communication between the vehicles 10, 20. In this case, the towing vehicle 20 regularly transmits a drive request or brake request as towing vehicle data to the motor vehicle 10. In order to ensure that the drive or brake requests do not exceed the capability of the motor vehicle 10 with respect to the drive output or braking power, the corresponding capability, including a maximum drive output and braking power, is regularly transmitted from the motor vehicle 10 to the towing vehicle 20. When the communication is being performed in an active manner, the towing vehicle 20 controls the operating method 40.

If the operating method 40 is controlled by the motor vehicle 10, a sensor signal is used as an alternative or in addition to the passive communication in order to ascertain the driving state of the towing vehicle 20. The sensor signal may be used by an internal sensor in the motor vehicle, such as by way of example an acceleration sensor and/or a wheel rotational speed sensor. As an alternative or in addition to at least one of the aforementioned variants, the signal of the force sensor 14 is used and said force sensor indicates the force F that is prevailing at the connecting device 23. In the exemplary embodiment illustrated in FIG. 3, the force F that is prevailing at the connecting device 23 and the acceleration a are used in the data acquisition step 41. In addition, a state of charge of the battery of the motor vehicle 10 is ascertained.

Different responses to the towing vehicle data are provided, in particular pushing, simultaneous travel or towing procedures.

During the pushing procedure, a pushing force 60 is exerted by the motor vehicle 10 on the towing vehicle 20. The towing vehicle 20 is pushed by means of the motor vehicle 10. The pushing force 60 is a forward-directed force, thus a force that is directed in the direction of travel. In particular, the steering system of the motor vehicle 10 is also controlled during the pushing procedure with the result that the motor vehicle 10 follows the path of the towing vehicle 20 and in particular if the towing vehicle 20 and the motor vehicle 10 are connected to one another via a coupling rod as a connecting device 23.

During the towing procedure, a pulling force 61 is exerted by the motor vehicle 10 on the towing vehicle 20. The motor vehicle 10 is towed by the towing vehicle 20. The towing force 61 is a rearward-directed force, including a force that is directed in the opposite direction to the direction of travel.

During the simultaneous travel procedure, neither a pushing force 60 nor a pulling force 61 is exerted by the motor vehicle 10 on the towing vehicle 20. The motor vehicle 10 travels simultaneously with the towing vehicle 20.

The responses may be implemented by means of various steps 42, 43, 44, 45, 46, 47, 48, 49, 50 that are performed in particular in addition in dependence upon the state of charge of the battery of the motor vehicle 10.

In the exemplary embodiment illustrated in FIG. 3, consideration is given to the force F that is prevailing at the connecting device 23. If the prevailing force F is almost zero, then in a first step 42 the motor vehicle operation remains unchanged, in particular for as long as the battery of the motor vehicle 10 is almost fully charged or almost empty.

If the prevailing force F is not almost zero, then a decision is made as to which direction the prevailing force F is acting in. In addition, the magnitude of the acceleration a and also the state of charge of the battery of the motor vehicle 10 are taken into consideration.

If the prevailing force F is directed in the forward direction f and simultaneously the acceleration a is positive and the state of charge of the battery of the motor vehicle 10 is good, then a second step 43 is performed. During the course of the second step, the drive output with which the motor vehicle 10 is driven increases, in particular up to the maximum in order to support the towing vehicle 20 during the acceleration procedure. This results in particular in the towing vehicle 20 being pushed by the motor vehicle 10.

If the prevailing force F is directed in the forward direction f and simultaneously the acceleration a is positive and the state of charge of the battery of the motor vehicle 10 is poor, then a third step 44 is performed.

During the course of the third step, the drive output with which the motor vehicle is driven is reduced or the motor vehicle 10 ceases to be driven. In particular, the pushing procedure is terminated.

If the prevailing force F is directed in the forward direction f and simultaneously the acceleration a is almost zero and the state of charge of the battery of the motor vehicle 10 is good, then a fourth step 45 is performed. During the course of the fourth step, the drive output with which motor vehicle 10 is being driven is increased, in particular in such a manner that the motor vehicle 10 does not exert any load on the towing vehicle 20. In particular, this results in the simultaneous travel of the motor vehicle 10.

If the prevailing force F is directed in the forward direction f and simultaneously the acceleration a is almost zero and the state of charge of the battery of the motor vehicle 10 is poor, then a fifth step 46 is performed. During the course of the fifth step, the drive output with which the motor vehicle 10 is driven reduces or the motor vehicle 10 ceases to be driven. In particular, the simultaneous travel is terminated.

If the prevailing force F is directed in the forward direction f and simultaneously the acceleration a is negative, then a sixth step 47 is performed. During the course of the sixth step, the recuperation is reduced with the result that the force that is required to pull the motor vehicle 10 is reduced.

If the prevailing force F is directed in the rearward direction r and simultaneously the acceleration a is positive, then a seventh step 48 is performed. During the course of the seventh step, the drive output with which the motor vehicle 10 is driven is reduced.

If the prevailing force F is directed in the rearward direction r and simultaneously the acceleration a is almost zero and the state of charge of the battery of the motor vehicle 10 is good, then the fourth step 42 is performed, during which the drive output with which the motor vehicle 10 is driven is not changed.

If the prevailing force F is directed in the rearward direction r and simultaneously the acceleration a is almost zero and the state of charge of the battery of the motor vehicle 10 is poor, then the fifth step 46 is performed, during which the drive output with which the motor vehicle 10 is driven is reduced or the motor vehicle 10 ceases to be driven. In particular, the simultaneous travel is terminated.

If the prevailing force F is directed in the rearward direction r and simultaneously the acceleration a is negative and the battery of the motor vehicle 10 is fully charged, then an eighth step 49 is performed. During the course of the eighth step, the motor vehicle 10 is decelerated by means of a brake, in particular by means of a friction brake. In particular, this results in the motor vehicle 10 being towed.

If the prevailing force F is directed in the rearward direction r and simultaneously the acceleration a is negative and the battery of the motor vehicle 10 is not fully charged, then a ninth step 50 is performed. During the course of the ninth step, the recuperation is increased and as a result the motor vehicle 10 is decelerated more intensely. In particular, this likewise results in the motor vehicle 10 being towed.

The operating method 40 in accordance with the invention is performed in particular in such a manner that, if the towing vehicle 20 comprises a combustion engine as a drive, the towing/towed arrangement 30 provides the drive of the towing vehicle 20 and the electrical drive 11 of the motor vehicle 10 together as a hybrid drive. It is possible by virtue of the active communication to operate the towing/towed arrangement as a complete hybrid vehicle, wherein the combustion engine portion of the complete drive output is provided by the towing vehicle 20 and the electric motor portion of the complete drive output is provided by the coupled motor vehicle 10. By way of example, it is possible in operating points that require less complete drive output, in other words for example when traveling at a constant, low velocity, to travel using purely electrical power as long as the state of charge of the battery of the motor vehicle 10 allows this. This has the advantage of increasing efficiency since combustion engines, in particular combustion engines that are configured for the Otto cycle, function during low loads often with an extremely low level of efficiency, and the overall level of efficiency is increased by virtue of avoiding these operating points by means of driving under electrical power. In the cases if the state of charge of the battery is low, the electric drive 11 may be operated as a generator in order to charge the battery which has in particular the advantage that the combustion engine of the towing vehicle 20 is operated under a higher load and as a consequence is operated at a considerably higher level of specific efficiency (fuel consumption per kWh drive energy). The corresponding strategies of operating a hybrid drive in dependence upon the load and state of charge of the battery and also further parameters are known per se from the prior art and may be applied in the towing/towed arrangement 30 that is being operated as a complete hybrid vehicle.

Although the invention is further illustrated and described in detail with reference to the preferred exemplary embodiments, the invention is not limited by the disclosed examples and other variations may be derived therefrom by the person skilled in the art without abandoning the protective scope of the invention.

The figures are not necessarily true in detail and true to scale and may be enlarged or reduced in size in the illustration in order to offer a better overview. Therefore functional details that are disclosed herein are not to be understood as limiting but rather merely as a visual basis that offers an introduction to the person skilled in the art in this field of technology in order to use the present invention in numerous ways.

When used in a series of two or more elements, the term "and/or" used in this document means that each of the listed elements may be used as stand-alone or may be used in any combination of two or more of the listed elements. If by way of example a composition is described that comprises the components A, B and/or C, the composition may be A alone; B alone; C alone; A and B in combination; A and C in combination; B and C in combination; or A, B, and C in combination.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a connecting rod configured to couple the vehicle to a towing vehicle;
a force sensor configured to measure the prevailing force between the vehicle and the towing vehicle;
an electric machine;
a traction battery coupled to the electric machine and having an associated state of charge (SOC); and
a controller configured to control the electric machine while the vehicle is towed behind the towing vehicle to provide one of a driving force and a braking force responsive to wirelessly communicated data between the vehicle and the towing vehicle and in response to direction of a prevailing force between the vehicle and the towing vehicle as determined by the force sensor, acceleration of the vehicle, and the SOC, wherein the wirelessly communicated data from the towing vehicle includes a drive request or a brake request and the wirelessly communicated data from the vehicle includes a maximum drive output and braking power.

2. The vehicle of claim 1 wherein the controller is further configured to provide the driving force responsive to the direction of the prevailing force being forward, the acceleration being positive, and the SOC being above an SOC threshold.

3. The vehicle of claim 1 wherein the controller is further configured to provide the braking force responsive to the direction of the prevailing force being rearward and the acceleration being negative.

4. The vehicle of claim 3 wherein the controller is further configured to control the electric machine to perform regenerative braking to provide the braking force in response to the SOC being below an associated SOC threshold.

5. The vehicle of claim 4 wherein the controller is further configured to control friction brakes of the vehicle to provide the braking force in response to the SOC being above the associated SOC threshold.

\* \* \* \* \*